UNITED STATES PATENT OFFICE.

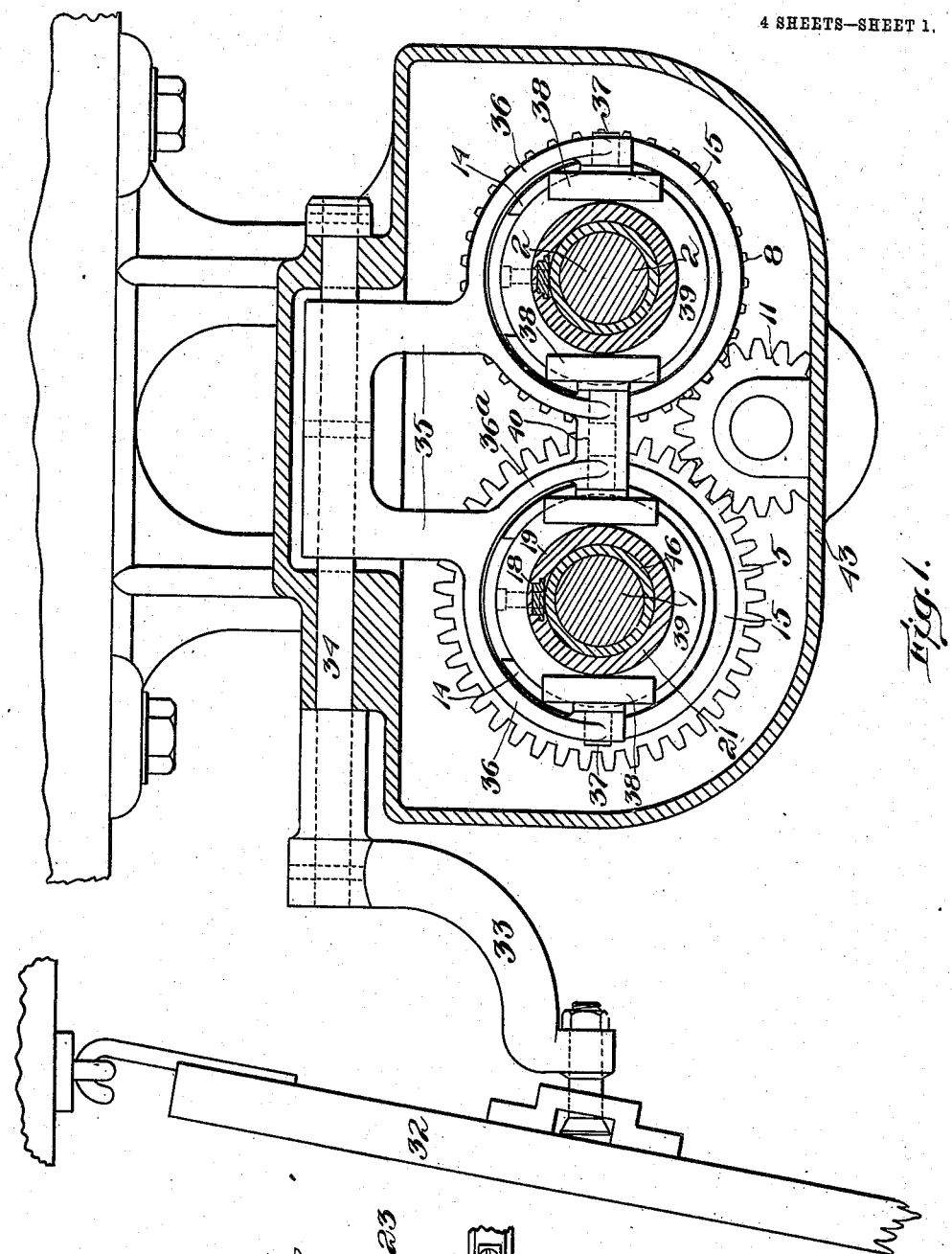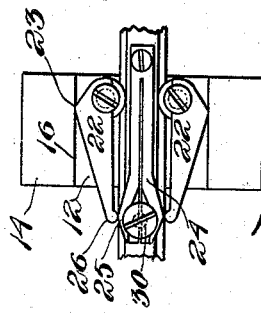

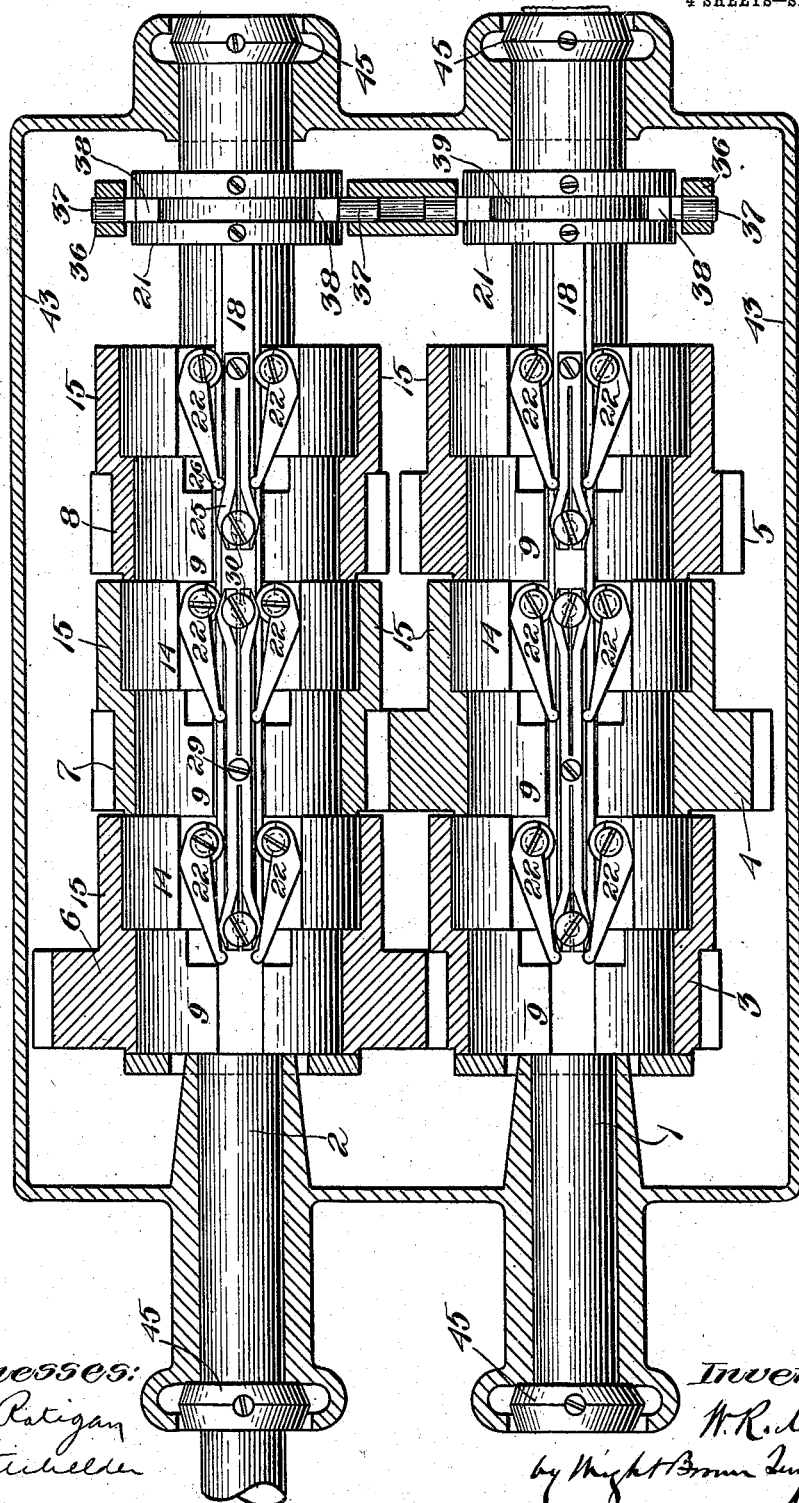

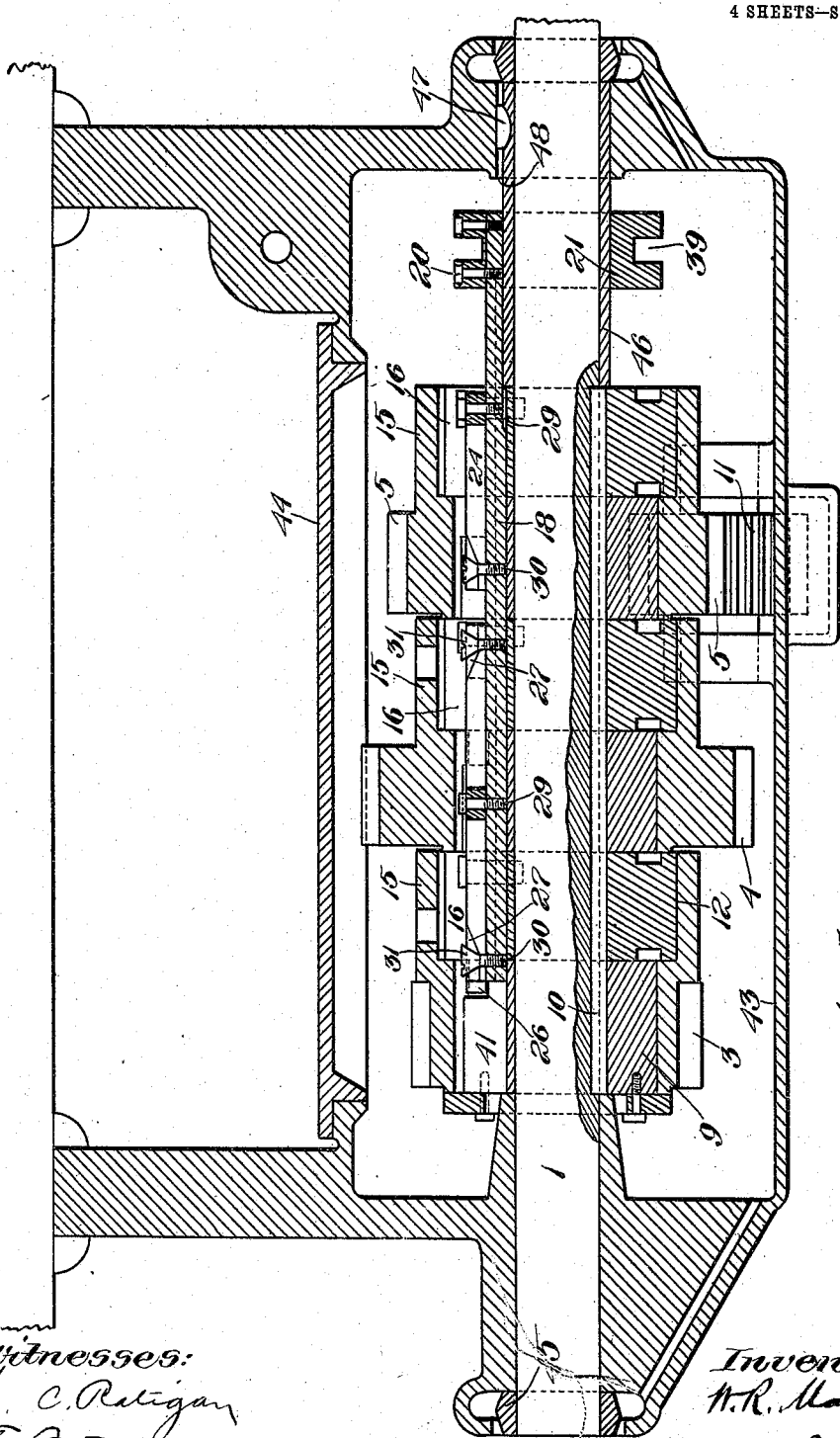

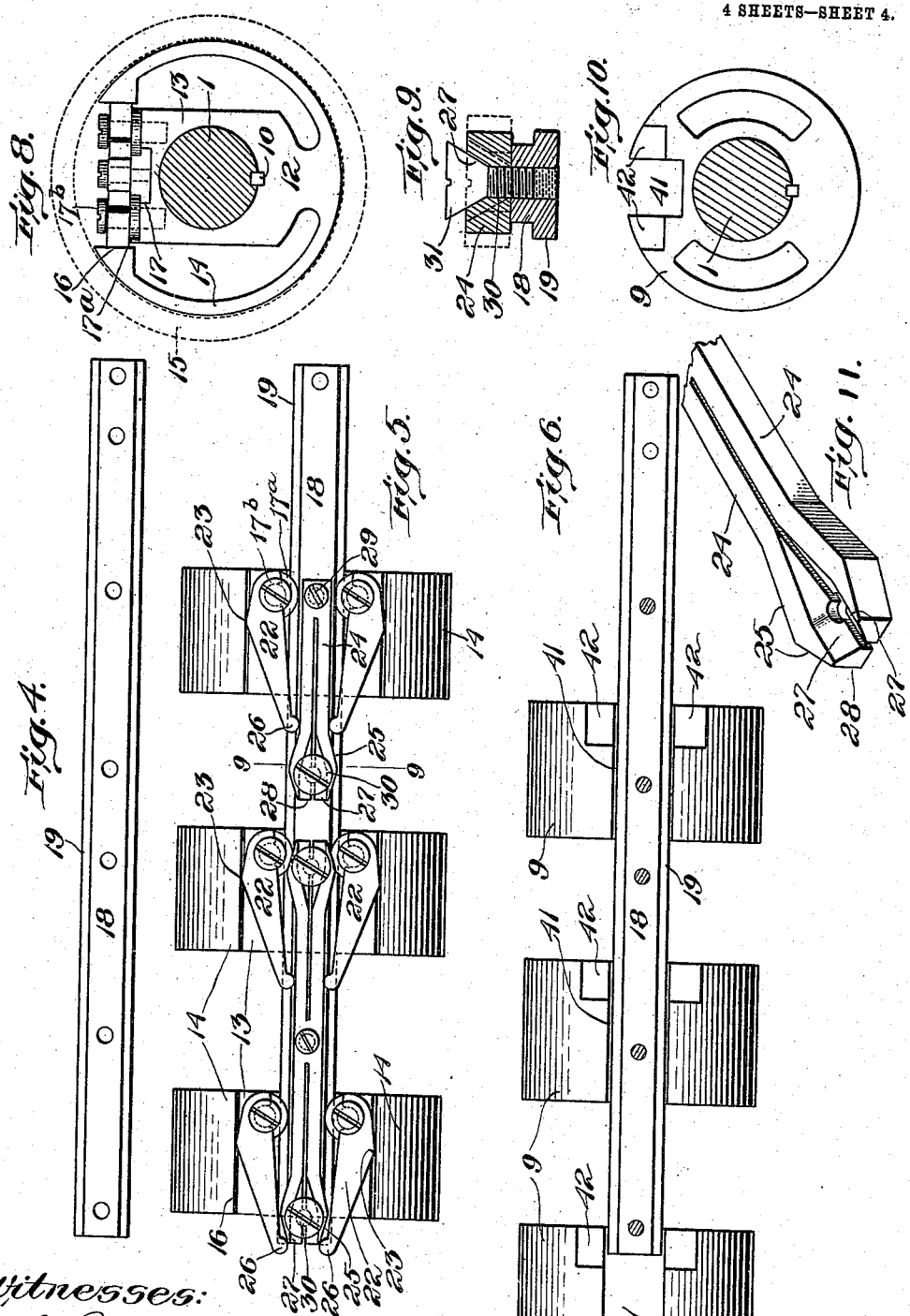

WILLIAM R. MAY, OF NEWTON, MASSACHUSETTS.

VARIABLE-SPEED GEARING.

No. 840,504.

Specification of Letters Patent.

Patented Jan. 8, 1907.

Application filed January 27, 1906. Serial No. 298,212.

*To all whom it may concern:*

Be it known that I, WILLIAM R. MAY, of Newton, in the county of Middlesex and State of Massachusetts, have invented certain new and useful Improvements in Variable-Speed Gearings, of which the following is a specification.

This invention relates to gearing for connecting two or more shafts so that one, which is the driver, may actuate another, the follower, at a number of different speeds, the speed of the driver being constant.

The object of the present invention is to produce a construction of the above character which will be certain in operation without undue friction and will be capable of adjustment so that a firm engagement of the frictional clutches which detachably unite the gearing and shafts may be possible at all times.

In order to carry out the above invention, I have constructed the mechanism described and claimed in the following specification and illustrated in the drawings forming a part thereof, in which—

Figure 1 represents a cross-sectional view of mechanism including the preferred form of my improved variable-speed gearing. Fig 2 represents a horizontal section thereof, showing the shafts, clutches, and clutch-operating devices in plan. Fig. 3 represents a vertical section through one of the shafts. Figs. 4, 5, and 6 represent detail views of the clutch-operating means which detachably connect the gears to the shafts. Fig. 7 represents a fragmentary view showing the position of one of the clutch-operating devices when the clutch is engaged with a gear. Fig. 8 represents an elevation of one of the clutches.
Fig. 9 represents a section on line 9 9 of Fig. 5, showing one of the adjustable clutch-operating wedges. Fig. 10 represents an end elevation of one of the hubs or collars on which the gear-wheels are held. Fig. 11 represents a perspective view of a portion of one of the wedges.

The same reference characters indicate the same parts in all the figures.

Referring to the drawings, 1 and 2 represent shafts, of which either may be the driver and the other the follower; but for convenience I will here designate the shaft 1 as the "driver," which is adapted to be rotated by any suitable means, (not shown,) while 2 will be called the "driven shaft." Upon the shaft 1 are a number of gear-wheels 3, 4, and 5 of varying sizes, while upon the other shaft are coöperating gear-wheels 6, 7, and 8. These gears are centrally bored and are mounted to rotate loosely upon hubs or collars 9, secured to the shafts 1 and 2 by keys 10. These hubs rotate with the shafts while the wheels turn idly or may be stationary except when a coöperating pair of them is clutched between the shafts.

The wheels 3 and 6 mesh together and constitute a slow-speed drive for the following shaft 2, while gears 4 and 7 intermesh and drive the follower at a higher speed. Gears 5 and 8 are shown in the present embodiment of the invention as being out of mesh and connected together by an intermediate idle pinion 11. This train of gearing, consisting of the wheels 5, 11, and 8, constitutes a reversing device for turning shaft 2 in the opposite direction from that in which it rotates when either 3 and 6 or 4 and 7 are fixed to the shafts 1 and 2, respectively.

In order to connect the wheels on either shaft one at a time with the respective shaft, I provide friction-clutches 12, which are located upon the respective shafts between the hubs 9 and are caused to turn therewith by the keys or splines 10, above referred to. These clutches have hub portions 13 immediately surrounding the shafts and extending therefrom resilient friction-arms 14, the outer surfaces of which are cylindrical and lie within and close to the inner surfaces of sleeve 15, projecting laterally from the several gear-wheels. The friction-arms terminate in shoulders 16 adjacent a square side of the hub 13, in which side is formed a guideway 17, through which passes a long bar 18, having flanges 19 in its lower side, projecting under collars 17ᵃ at the sides of the guideways, said collars being formed on the screws 17ᵇ. The bar 18 extends through the whole space occupied by all the clutches and somewhat beyond the endmost clutch, being secured by screws 20 to a collar 21 on the shaft.

Pivoted to the side of hub 13, which has the guideway 17, are levers 22, which on their outer sides and intermediate their ends are formed with angular protuberances 23, forming relatively sharp corners or edges which bear against the shoulders 16 of the friction-arms 14. Each clutch carries two of these levers, one of which is on each side of the bar 18. Between the levers 22 of each pair is a bar 24, having inclined sides 25, forming wedges which when the bar is moved endwise enter between the free ends 26 of levers 22 and spread them apart, causing the bearing knife-edges 23 to press against the friction-arms 14 and spring the latter outward into engagement with a sleeve 15. The widened portions of the wedge-bars 24 are tapered in both directions, so that they will act when moving in either direction.

The wedge-bars 24 are made of hard resilient metal and are split throughout the greater portion of their length, providing on each two arms which may be pressed more or less apart by suitable means. As shown in the drawings, the enlarged portions of these bars having the inclined sides 25 are adjacent the ends, and the dividing slot or kerf is tapered so that the adjacent sides 27 of the arms 28 into which the wedge-bar is divided are inclined away from each other in an outward direction from the motor-bar 18. The wedge-bar is secured to the motor-bar by screws 29 30 near the opposite ends of the former, and the screw 30 has an enlarged conical head 31, the sides of which engage the inclined walls 27. Thereby as the screw is driven a greater or less distance into the motor-bar 18 the arms 28 are separated more or less and the wedge correspondingly widened or contracted.

On account of the adjustability of the wedges the amount of pressure which the clutch-arms are adapted to exert against the sleeves 15 of the gears may be varied and the frictional engagement made as tight or as loose as desired.

The sleeves or collars 21 are duplicated, there being one on each of the shafts, and so also the clutches, hubs, and clutch-operating means on one shaft are duplicates of those on the other, while all the hubs and clutches are alike and interchangeable. The means for operating the clutches consists of a lever 32, connected with a follower-arm 33 on a rock-shaft 34, to which also are secured arms 35. Each of these arms is divided into two parts, forming semicircular yokes 36, partially surrounding the collars 21. The ends of the arms forming the yokes are enlarged and provide bearings for studs 37, to which are secured bars 38, extending into circumferential grooves 39 in the collars 21. The innermost arms 36ª of the yokes are connected together by a sleeve 40, which forms a bearing for two of the above-named studs 37. When the lever 32 is rocked, it rocks the arms 33 and 35 and causes the collars 21 to be moved endwise on the shafts, thereby moving the bars 18 and 24 endwise.

As will be seen from the drawings, particularly Fig. 2, the wedges are arranged so that no more than one gear-wheel on each shaft will be clutched thereto at one time, and thereby as successive movements are given to the actuator-bars one clutch after the other is thrown into engagement. In the arrangement of Fig. 2 all clutches are inoperative; but if sleeves 21 are moved toward the left the slow-speed-actuating wheels 3 6 are coupled to the shafts. Further movement in the same direction allows the slow-speed gears to be disconnected and the high-speed wheels 4 7 fixed to the shaft, while a movement to the right would throw into operation the reversing-gears 5 and 8, the two-speed forward-driving gears being meanwhile allowed to rotate idly.

For convenience and economy of space and of the number of parts the wedges which actuate the clutches for gears 3 and 4 are made in one piece, as also are the corresponding wedges for gears 6 and 7, each end of these wedge-bars being enlarged and provided with the adjusting-screws 30, while the non-adjusting screw 29 is located at the middle of the bar. Each hub 9 is provided with a channel 41 parallel with its axis, through which the motor-bar 18 passes, and also with recesses 42 on each side of the channel, into which the ends of the clutch-actuator levers project.

The whole mechanism is inclosed within a casing 43, having a detachable top 44, which may be dust and moisture proof and may be, if desired, filled with oil. A set-collar 45 on the shafts where they project through the casing holds them against endwise movement.

In the construction described above, where wedges act upon the long arms of levers which have shorter arms engaging the clutches to set them in operation, great mechanical power may be applied to connect the clutches with the gears with but little expenditure of force. The expenditure of force is further diminished by the character of the bearing which the levers have against the clutch members, this being, as above described, between the edges 23 and the faces 16 of the friction-arms. Each edge bears upon a very small area which is hardly more than a straight line, and is therefore almost infinitesimal. Thus knife-edge bearings are provided by which friction is practically eliminated.

I have shown and described the members 3 4 5 6 7 8 as intermeshing spur gear-wheels;

but the invention is not limited to this particular type of gearing, since any other of the well-known forms may be used—such, for instance, as sprocket-wheels connected together by chains.

In order that the shafts and keys 10 may be inserted in the casing, the openings at one end thereof through which the shafts project are made of greater diameter than the shafts, and after the latter have been put in place the spaces surrounding the shafts are filled by the bushings 46, which provide bearings for the shafts. These bushings are held from rotation by keys 47, projecting into keyways 48 in the casing.

The several clutches act directly upon portions of the gear-wheels, which are of the least possible length consistent with a firm bearing and a secure clutching connection. It is possible with the arrangement shown and described to place the clutches close together upon each shaft with but the slightest spaces between them, and thereby an extremely compact arrangement is made and the length of the apparatus reduced to the minimum.

I claim—

1. Variable-speed gearing comprising a plurality of shafts, coöperating wheels of varying sizes on the shafts, clutches intermediate the wheels and shafts for detachably connecting them, levers bearing directly against said clutches over limited areas, and means for moving said levers against the clutches.

2. Variable-speed gearing comprising a plurality of shafts, coöperating wheels of varying sizes on the shafts, clutches intermediate the wheels and shafts for detachably connecting them, levers having knife-edge bearings on said clutches, and means pressing the knife-edges of said levers against the clutches.

3. Variable-speed gearing comprising a plurality of shafts, coöperating wheels of varying sizes on the shafts, clutches intermediate the wheels and shafts for detachably connecting them, levers having integral short arms bearing directly against said clutches over limited areas, and means arranged to actuate the longer arms of said levers to press the short arms against the clutches.

4. Variable-speed gearing comprising a plurality of shafts, coöperating wheels of varying sizes on the shafts, clutches intermediate the wheels and shafts for detachably connecting them, levers bearing against said clutches over limited areas, and means for moving said levers against the clutches adjustable to vary the force of the pressure exerted by the levers against the clutches.

5. Variable-speed gearing comprising a plurality of shafts, coöperating wheels of varying sizes on the shafts, clutches intermediate the wheels and shafts for detachably connecting them, levers having intermediate their pivots and free ends protuberant angles forming bearing knife-edges adapted to press against the clutches, and actuators adapted to engage the levers adjacent their free ends and force the knife-edges thereof against the clutches.

6. Variable-speed gearing comprising a plurality of shafts, coöperating wheels of varying sizes on the shafts, clutches intermediate the wheels and shafts for detachably connecting them, and wedges adjustable in width constructed and arranged to operate the clutches to connect the shafts and wheels.

7. Variable-speed gearing comprising a plurality of shafts, coöperating wheels of varying sizes on the shafts, clutches intermediate the wheels and shafts for detachably connecting them, and an actuator for the clutches carrying enlargements of variable extent adapted, when adjacent the clutches, to operate the same.

8. Variable-speed gearing comprising a plurality of solid shafts, coöperating wheels of varying sizes on each shaft, the wheels of one shaft being loosely mounted, normally inoperative clutches between the several loose wheels and the shaft, and an actuator therefor wholly external of the latter shaft carrying a plurality of protuberances arranged to come into operating relation with the clutches one at a time to connect the wheels singly.

9. Variable-speed gearing comprising a plurality of shafts, coöperating wheels of varying sizes on each shaft, the wheels of one shaft being loosely mounted, normally inoperative connecting devices between the several loose wheels and the shaft, and an actuator therefor carrying a plurality of protuberances arranged to come into operating relation with the clutches one at a time to connect the wheels singly, said protuberances being variable in extent so that the degree of clutch-engaging pressure may be varied.

10. In a device of the character described, a solid shaft, a plurality of wheels loose thereon, clutches secured to the shaft closely adjacent each other, for detachably connecting the several wheels to the shaft, and an actuator mounted wholly externally of the shaft and provided with means for operating the several clutches in succession.

11. In a device of the character described, a solid shaft, a plurality of wheels loose thereon, friction-clutches secured to the shaft closely adjacent each other, for detachably connecting the several wheels to the shaft, and an actuator mounted wholly externally of the shaft and provided with means for operating the several clutches in succession.

12. In a device of the character described, a solid shaft, a plurality of wheels loose thereon, friction-clutches secured to the shaft closely adjacent each other, for detachably connecting the several wheels to the shaft, and an actuator mounted wholly externally of the shaft and provided with means for operating the several clutches in succession, said means being movable wholly through a clutch from one side to the other thereof.

In testimony whereof I have affixed my signature in presence of two witnesses.

WILLIAM R. MAY.

Witnesses:
A. C. RATIGAN,
C. F. BROWN.